(12) United States Patent
Viger et al.

(10) Patent No.: US 7,908,345 B2
(45) Date of Patent: Mar. 15, 2011

(54) METHOD AND DEVICE FOR ACCESS TO A DIGITAL DOCUMENT IN A COMMUNICATION NETWORK OF THE STATION TO STATION TYPE

(75) Inventors: Pascal Viger, Coesmes (FR); Frédéric Mazé, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1388 days.

(21) Appl. No.: 10/814,134

(22) Filed: Apr. 1, 2004

(65) Prior Publication Data

US 2004/0205060 A1 Oct. 14, 2004

(30) Foreign Application Priority Data

Apr. 8, 2003 (FR) .................................. 03 04363

(51) Int. Cl.
*G06F 15/16* (2006.01)
*G09G 5/36* (2006.01)
(52) U.S. Cl. .................. 709/219; 709/217; 345/557
(58) Field of Classification Search .......... 709/230–231, 709/217–219; 345/557, 581, 619; 382/298, 382/305; 715/201; 725/115
See application file for complete search history.

(56) References Cited

U.S. PATENT DOCUMENTS

| 7,006,099 B2 * | 2/2006 | Gut et al. ..................... 345/557 |
| 2002/0087728 A1 | 7/2002 | Deshpande et al. ............ 709/246 |

FOREIGN PATENT DOCUMENTS

| WO | WO 02/15011 A2 | 2/2002 |
| WO | WO 02/46946 A1 | 6/2002 |

OTHER PUBLICATIONS

J.H.P. Chim, et al., "On Caching and Prefetching of Virtual Objects in Distributed Virtual Environments" ACM Mulitimedia, Proceedings of the International Conference (1998), New York, NY, USA, pp. 171-180, XP000874334.

L. Xiao, et al., "On Reliable and Scalable Peer-to-Peer Web Document Sharing," Parallel and Distributed Processing Symposium, Proceedings International (IPDPS 2002), Abstracts and CD-ROM, Ft. Lauderdale, FL, USA, Apr. 15-19, 2002, Los Alamitos, CA, USA, IEEE Comput. Soc., USA, Apr. 15, 2002, pp. 224-231, XP010591038, ISBN: 0-7695-1573-8.

* cited by examiner

*Primary Examiner* — Peling A Shaw
(74) *Attorney, Agent, or Firm* — Fitzpatrick, Cella, Harper & Scinto

(57) ABSTRACT

The access method comprises the following steps: selecting a first data item in a digital document designated by a predetermined identifier, said digital document comprising at least first and second data items linked to each other in a chosen hierarchical relationship; verifying the presence of at least one address of a location containing said second data item of the digital document in storage means of the client device; in the absence of said address in said storage means, seeking said address in the network; in the event of a positive search, storing said address in the storage means of the client device; and subsequently accessing said second data item of the document from the address thus stored by anticipation and thus immediately available locally.

19 Claims, 6 Drawing Sheets

METHOD AND DEVICE FOR ACCESS TO A DIGITAL DOCUMENT IN A COMMUNICATION NETWORK OF THE STATION TO STATION TYPE

BACKGROUND OF THE INVENTION

The present invention relates to access to a digital document in a communication network, in particular of the station to station type, the said document comprising at least first and second data connected to each other in a chosen hierarchical relationship.

It finds a general application in rapid reliable access to digital data distributed in a communication network and more particularly in a communication network of the station to station type.

Public communication networks are known, such as the Internet, which are widely used as means of exchanging information throughout the world.

In the so-called "conventional" distribution mode, a client device connects to a distant server in order to obtain information. This information is named so that the distant server device is clearly identified. For example, an address or location, also referred to as URL according to the English acronym "Uniform Resource Locator", is associated with a resource (a data file) in order to identify the precise address of the Internet server device storing this resource.

In a distribution mode of this type, the latency caused with regard to the access to the data results directly in the time necessary for recovering the data from the distant server device to the client device.

So-called "station to station" or distributed communication networks are also known, commonly referred to as "peer to peer" topology in English.

In a station to station network, the equipment puts resources in common according to an equal to equal sharing philosophy. Thus each machine in a station to station network behaves both as a client and as a server.

Such networks are thus distinguished from the conventional "client-server" networks in which the resources are archived in a central server device.

At the present time the distribution of data is more and more having recourse to station to station networks because of their low establishment cost, the presence of very many computers connected to the network, and the development of high-rate connections.

However, station to station networks are unstable. This is because client devices (and consequently server devices) connect or disconnect periodically to the network, thus making the presence of the data very haphazard. In addition, the addresses of the client and/or server devices are unpredictable and liable to be different at each connection.

As a result, access to the contents in a communication network of the station to station type still constitutes a significant difficulty since the latency in obtaining the data is no longer simply due to the time needed for recovering the data as in conventional client-server topology but also the time for searching for a server device having this data available. According to the topology of the station to station network concerned, this search phase may be not insignificant.

A known solution for improving access to data in terms of speed consists of using a server device known as a "proxy-cache server" or proxy server with cache which serves as an intermediary between the computers in a local network and the Internet.

In practice it is a case of a server "authorized" by an application to make a request on the Internet in its place. Thus, when a user connects to the Internet by means of a client application configured for using a proxy server device, the said application will firstly connect to the proxy server device and give it its request. The proxy server device will then connect to the server device which the client application is seeking to join and will transmit the request to it. The server device will then give its response to the proxy server device, which will in its turn transmit it to the client application.

The majority of proxy server devices thus fulfill a cache function, that is to say the ability to keep in memory (in "cache") the pages most often visited by the users of the local network in order to be able to supply them to them as quickly as possible.

Thus a proxy server device with cache on the one hand reduces the use of the bandwidth to the Internet and reduces the access time to the documents for the users.

However, in order to succeed in this task, it is necessary for the proxy server device to regularly compare the data which it is storing in cache memory with the distant data in order to ensure that the data in cache are still valid.

As a result a proxy-cache server device is advantageous in repetitive access to the same data not only for the speed of access but also for reducing the Internet traffic.

However, a proxy-cache server device is ineffective for first access to data.

The solution known as searching by anticipation, or "prefetching" in English, is also known, which is based on the idea that, whilst a user is browsing on the Internet, the pages which he is assumed to display in the very near future are downloaded automatically in anticipation of their being requested by the user.

Thus, at the time of the actual request, the program browsing on the Internet can immediately display the data downloaded in anticipation. This method limits the data access latency time.

However, this solution is not completely satisfactory since very often the data downloaded in anticipation are never used, which means that the method unnecessarily overloads the consumption of the network bandwidth.

As a result, in systems using such a solution, this increase in load contributes to an increase in the waiting time for the requests of the user (requests by the user for non-anticipated data), which has the opposite effect to that sought and degrades performance. In addition, the undesirable effect on the Internet (the addition of network traffic and overloading of the servers) would be not insignificant if all the browsers on the Internet used such a method of search by anticipation.

SUMMARY OF THE INVENTION

The Applicant posed for itself the problem of optimizing (in terms of speed) access to digital data in a communication network, in particular of the station to station type, without the drawbacks of the prior technologies mentioned above.

The present invention affords precisely a solution to this problem.

It relates to a method of access to a digital document in a communication network, in particular of the station to station type, the said method being implemented in a client device.

According to a general definition of the invention, the method comprises the following steps:

selecting a first data item in a digital document designated by a predetermined identifier, said digital document comprising at least first and second data items linked to each other in a chosen hierarchical relationship;

verifying the presence of at least one address of a location containing said second data item of the digital document in storage means of the client device;

in the absence of said address in the storage means of the client device, seeking said address in the network;

in the event of a positive search, storing said address in the storage means of the client device; and subsequently accessing said second data item of the document from the address thus stored by anticipation and immediately available.

The method according to the invention guarantees a saving in waiting time for recovering the second data item of the digital document after the selection by the user of the identifier of said document, the first data item of the digital document in practice being at least identified and located. The increase in the quality of service is directly visible (the reduction in the waiting time involves increased satisfaction of the user).

The method according to the invention also respects the consumption of the bandwidth of the network, by limiting the transfer of unnecessary data. For example, the potential overconsumption is greatly reduced in comparison with the prefetching systems of the prior art.

In addition, the method according to the invention is compatible with all the communication network topologies, especially of the station to station type, and with the search methods on these networks.

Because of its impact on the management of the data search phase, the method according to the invention can be associated with the various systems which focus on improving the actual obtaining of the data (for example proxy servers).

In practice, the address of the location containing the second data item of the digital document is local or distant.

For example, the step of searching for the address of the second data item of the digital document is implemented prior to any new access request emanating from the user.

The digital document belongs to the group formed by fixed images or photographs, video sequences, computer files of office application or the like.

According to one embodiment, the hierarchical relationship is horizontal in terms of resolution, the first and second data items being of the same resolution. For example, the digital document is a collection comprising a list of objects each having an identifier.

According to another solution, the hierarchical relationship is vertical in terms of resolution, the first and second data items being of different resolutions.

For example, the resolution of the first data item is less than that of the second data item.

According to another embodiment, the digital document comprises more than two different resolutions.

According to yet another embodiment, the method comprises the following steps:

determining the current resolution of the digital document available at the client device;

verifying the presence of at least one address of a location containing a higher resolution of the digital document in the storage means of the client device;

in the absence of said address in said storage means, seeking said address in the network;

in the case of a positive search, storing said address in the storage means of the client device; and subsequently accessing said higher resolution of the document from the address thus stored by anticipation and immediately available locally.

Another object of the present invention is a device for access to a digital document in a communication network, said access device being able to be incorporated in a client device of the network.

According to another aspect of the invention, the access device comprises:

means for selecting a first data item of a digital document designated by a predetermined identifier, said digital document comprising at least first and second data items connected to each other according to a chosen hierarchical relationship;

processing means able to verify the presence of at least one address of a location containing a second data item of the digital document in storage means of the client device;

search means able, in the absence of said address in said storage means, to seek said address in the network; the storage means being able to store said address in the event of a positive search; and means for subsequently accessing said second data item of the document from the address thus stored by anticipation and immediately available locally.

In the case of a multiresolution document, the processing means are also able to determine the current resolution of the digital document available at the client device; and to verify the presence of at least one higher resolution of the digital document in the storage means of the client device, whilst the search means are also able, in the absence of the higher resolution of the digital document in said storage means, to seek in the network an address of a location containing said higher resolution of the digital document; the storage means being able to store said address, and the access means are able to access the said higher resolution of the document from the address thus stored by anticipation and immediately available locally.

The present invention also relates to a system of access to a digital document in a communications network comprising an obtaining device incorporated in a client device as described briefly above.

The invention also relates to an information medium which can be read by a computer system, possibly totally or partially removable, in particular a CD-ROM or magnetic medium, such as a hard disk or a diskette, or a transmittable medium, such as an electrical or optical signal, and containing instructions of a computer program for implementing an obtaining method as described briefly above, when this program is loaded into and executed by a computer system.

The invention also relates to a computer program stored on an information medium, said program comprising instructions for implementing an obtaining method as briefly described above, when this program is loaded in and executed by a computer system.

Other characteristics and advantages of the invention will emerge in the light of the following detailed description and the drawings.

DETAILED DESCRIPTION OF THE INVENTION

Figure 1:
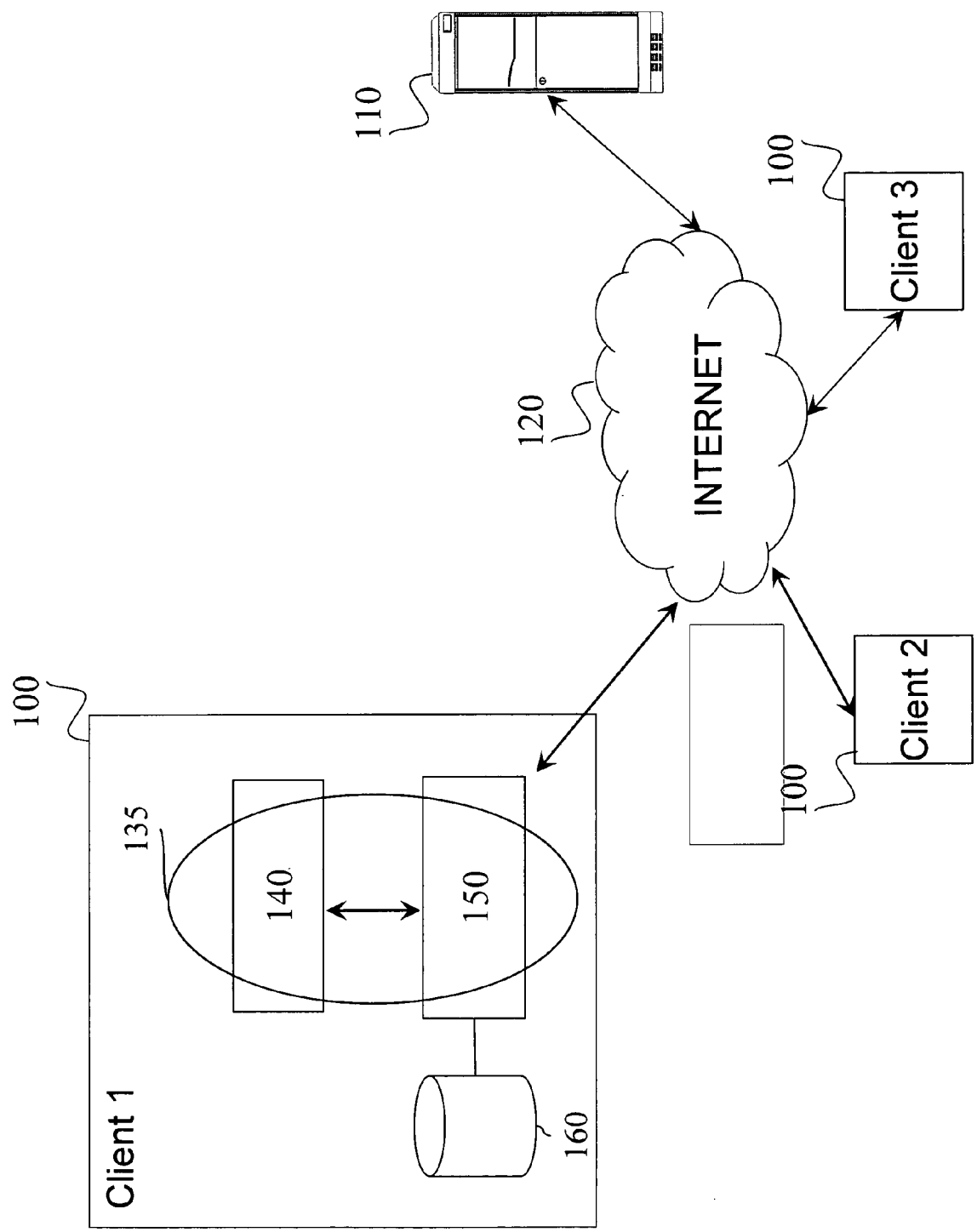
FIG. 1 depicts a communication network in which the access method is implemented according to the invention.

With reference to FIG. 1, a communication network 120 comprises several entities 100, 110 connected to said network 120. The network 120 is for example the Internet, which allows communications with an architecture of the client-server type where each device or client machine 100, individualized as CLIENT 1, CLIENT 2, CLIENT 3, periodically accesses server devices such as the central server device 110.

Connections of the "station to station" or "peer to peer" type between the client devices 100 may also be made in order to exchange shared data, independently of the central server device 110.

The client devices 100 can be connected to the network 120 using high-rate technologies (for example of the DSL type, standing for Digital Subscriber Line, or cable modem), or low-rate technologies (56 Kbits/s modem). The network 120 can equally well be a private LAN local network. The central server device 110 can be composed of several server devices coupled together and accessible from a single network address. The topology of the network 120 can be of the hybrid peer to peer type (with central server 110) or completely distributed, in which no central server 110 exists.

For example, the client device 100, individualized as CLIENT 1, comprises a volatile data storage device 160 (a cache memory is then spoken of, which can contain long-life data such as images, but also more volatile data such as lists of addresses), and a man/machine interface which affords interaction with the users.

The devices 100 can execute a client application, in the form of computer software 135, able to implement the methods and algorithms which will be described in more detail below.

The software programs 135 also comprise a display interface 140, which may be equivalent to browser software or specific software such as a dedicated photograph album. The display interface 140 is coupled to a local file server device 150.

The client software 135 executed on the machines 100 can be downloaded from a central server device 110. As an option, the software 135 can be installed as an extension module (plug-in) of a standard Internet browser.

In a variant, the software 135 can comprise two distinct elements communicating with each other. The first element is for example software of the interface type able to manipulate the display interface 140. The second element consists for example of software of the server type executed by the local server device 150 as soon as the client machine 100 is switched on.

For example, the algorithms which will be described in more detail below are executed by the second element (the server software) of the software 135.

In practice, in a machine 100 establishing a connection of the station to station type, any request issuing from the interface 140 passes through the server software 150 so that the latter decides on the action to take. The server software 150 can have a role of appointed server (or proxy) with which a storage memory area 160 is associated.

Figure 2:
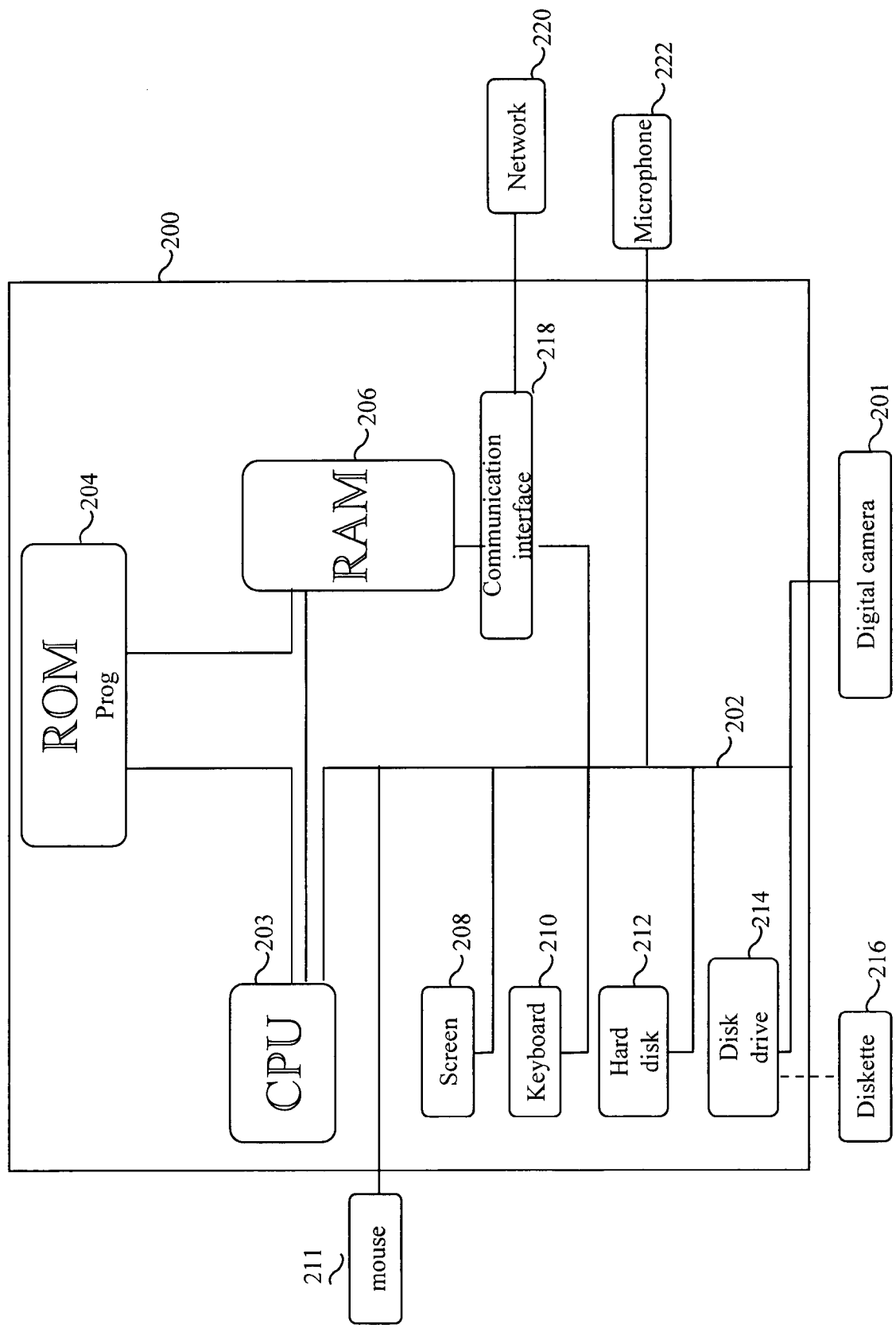
FIG. 2 is a detailed representation of an access device according to the invention.

With reference to FIG. 2, the apparatus forming the client device 100 described with reference to FIG. 1 is for example a microcomputer 200, a workstation, a digital assistant, a camera, a portable telephone or the like.

The apparatus 200 is connected to various peripherals such as, for example, a digital camera 201 (or a scanner or any image acquisition or storage means) connected to a graphics card and supplying multimedia data to the apparatus.

The apparatus 200 comprises a communications bus 202 to which there are connected:
- a central processing unit or CPU 203 of the microprocessor type for example;
- a memory or ROM 204, which may contain programs "PROG" supporting the invention;
- a random access memory or RAM 206 (cache memory), containing registers adapted to record variables and parameters created or modified during the execution of the aforementioned programs;
- a screen 208 for displaying data and/or serving as a graphical interface with the user, who will be able to interact with the programs according to the invention, by means of the keyboard 210 or any other means such as a pointing device, such as for example a mouse 211 or an optical pen;
- a communication interface 218 connected to a distributed communication network 220, for example the Internet described with reference to FIG. 1, the interface being able to transmit and receive data.

In the case of audio data, the apparatus 200 can also comprise an input/output card (not shown) connected to a microphone 222. The apparatus 200 can optionally have a hard disk 212 able to contain the programs "PROG" and a disk drive 214 able to receive a diskette 216 and to read or write thereon data processed or to be processed.

The communication bus 202 affords communication and interoperability between the various elements included in the microcomputer 200 or connected thereto. The representation of the bus is not limiting and in particular the central unit 203 is able to communicate instructions to any element of the microcomputer 200 directly or by means of another element of the microcomputer 200.

The executable code of each program enabling the programmable apparatus to implement the processes according to the invention can be stored, for example, on the hard disk 212 or in read only memory 204.

According to a variant, the diskette 216 can contain data, as well as the executable code of the aforementioned programs which, once read by the apparatus 200, is stored on the hard disk 212.

In another variant, the executable code of the programs can be received by means of the communication network 220, via the interface 218, in order to be stored in an identical fashion to that described above.

The diskettes can be replaced by any information medium such as, for example, a compact disk (CD ROM) or a memory card.

In general terms, an information storage means, which can be read by a computer or by a microprocessor, integrated or not into the apparatus, possibly removable, is adapted to store one or more programs whose execution enables the method according to the invention to be implemented.

In general terms, the program or programs can be loaded in one of the storage means of the apparatus 200 before being executed.

The central unit 203 controls and directs the execution of the instructions or portions of software code of the program or programs according to the invention, instructions which are stored on the hard disk 212 or in the read only memory 204 or in the other storage elements mentioned above.

On powering up, the program or programs which are stored in a non-volatile memory, for example the hard disk 212 or the read only memory 204, are transferred into the random access memory 206 (RAM), which will then contain the executable code of the program or programs according to the invention, as well as registers for storing the variables and parameters necessary for implementing the invention. The apparatus 200 comprising the device according to the invention can also be a programmed apparatus. This apparatus then contains the code of the computer program or programs, for example fixed in an application specific integrated circuit (ASIC).

In general terms, the present invention relates to access to a digital document comprising at least first and second data items connected to each other in a chosen hierarchical relationship.

The hierarchical relationship is said to be horizontal in terms of resolution when the first and second data items are of the same resolution.

Conversely, the hierarchical relationship is said to be vertical in terms of resolution when the first and second data items are of different resolutions.

Figure 3:
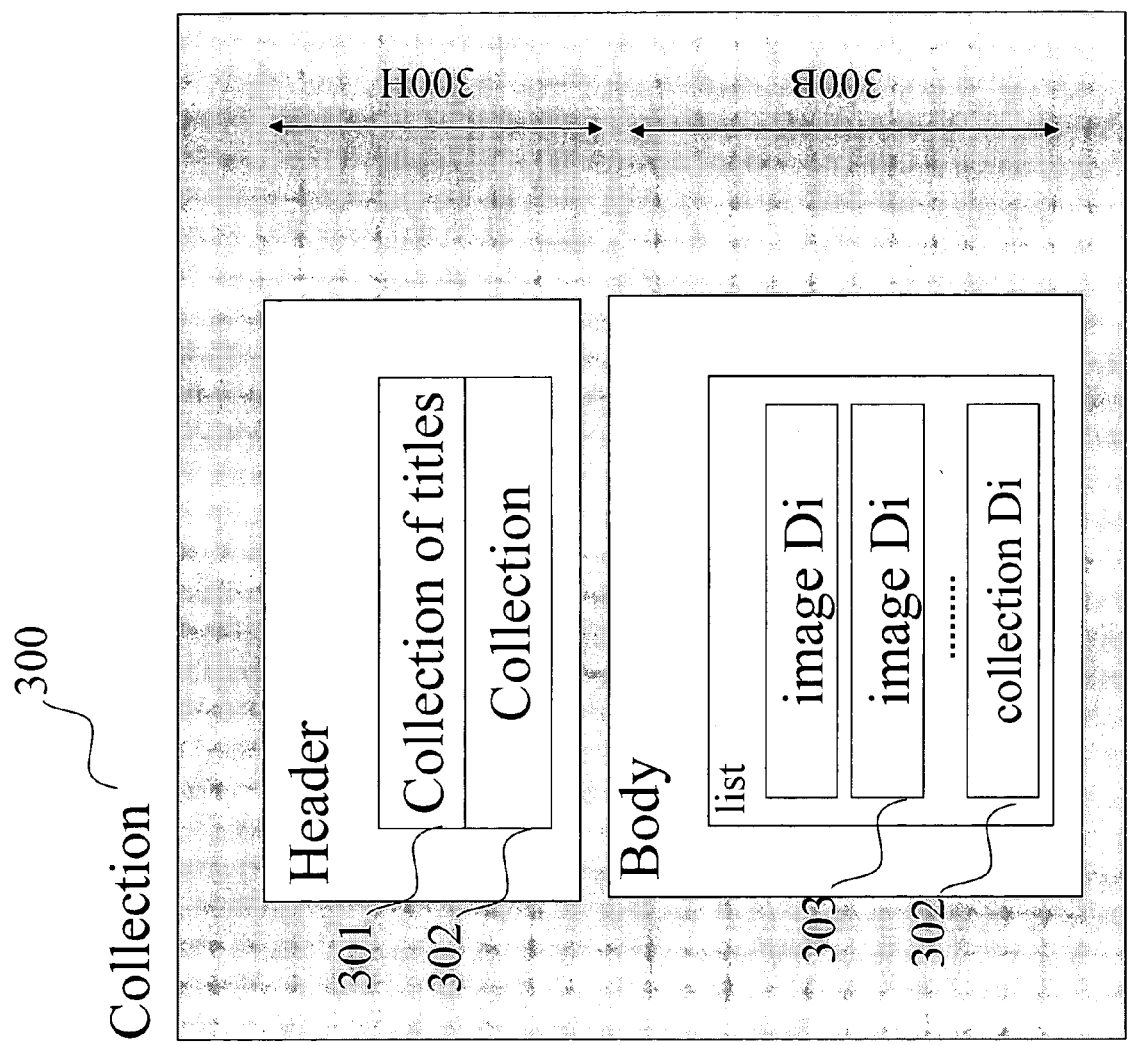
FIG. 3 is a description of a collection.

With reference to FIG. 3, the digital document is for example a collection 300 forming a set of references (identifiers) on media contents (images, videos, sounds) with metadata.

By extension, a collection can thus contain collections (also referred to as sub-collections).

Thus, in a collection, each object or data Di is of the same resolution, or similar. The hierarchical relationship between each data item Di is here of the horizontal type.

In a collection, the objects are distinguished from each other according to their rank i, indexed according to a chosen criterion, such as an alphanumeric order, a size or the like.

As will be seen in more detail below, the digital document can be multiresolution, the first data being of a resolution r different from, usually less than, that of the second.

In practice:
"thumbnail": means the low-resolution version r=0 (first data item) of a digital image (THUMBNAIL in English); and
"image": means the high-resolution version r=1 (second data item) of this digital image (digital document).

Clearly the invention is not limited to merely two resolutions but can also apply to more resolution levels r or to digital documents available on the network in several versions, representations, sizes and/or formats.

Likewise, the invention can also apply to video.

In this case, the start of a video flow can for example represent a minimum description of the complete video. The invention can also apply to office-application computer files. For example, the first bytes of these files make it possible to know the type of software application required to read them, and thus the user who is the destination of the sharing can choose the bytes of the files which he is able to display.

Subsequently, both digital images with a multiresolution format such as the JPEG 2000 format for example, and single-resolution digital images (for example the JPEG format), will be named as a multiresolution image. In the case of single-resolution digital images, the concept of multiresolution is supported by the construction of independent files corresponding to different sub-resolutions obtained from the same high-resolution image file.

The creation of a collection of digital images is known to persons skilled in the art. It will therefore not be described in detail here. Briefly, it consists of associating digital images with an image container (otherwise called a "collection"), for example by means of a suitable graphical interface.

In practice, all the versions of a digital image (thumbnail and image, that is to say first and second data) have the same unique identifier 303.

For example, the unique identifier 303 is generated automatically as soon as a new image is added to a collection. In order to determine the versions of the digital document identified by the unique identifier 303, this identifier 303 is associated with a "type" of data. In the example described here, this type can take two values, namely the "thumbnail" type and the "image" type.

By way of example (FIG. 3), a collection 300 comprises:
firstly a header 300 H comprising a title 301 and an identifier 302 of the collection; and
secondly a body 300 B comprising a list of identifiers 303 of the digital images in this collection.

A collection 300 can possibly itself comprise one or more other collections, that is to say the collection 300 can contain in its part 300B at least the identifier 302 of another collection.

The identifier 303 created on the machine of the user is assigned by the client application even if said client machine 100 is not connected to the network 120.

The allocation of the identifiers 303 can use a local production of random numbers. In practice, these identifiers 303 are unique in order to facilitate searches on the network. Tools well known to persons skilled in the art make it possible to generate identifiers with a low probability of duplication.

As seen above, the images are defined by an identifier 303 by the application of the client machine as soon as a new image is added to a collection. If the image is copied from an existing collection, the image keeps the original identifier.

The majority of the time, the type of data making it possible to distinguish the thumbnail from the image is implicit according to the requests sent over the network. For example, in the case of downloading, the image is requested whilst the thumbnail is useful for a simple display.

A user can structure the images, collection and sub-collection so as finally to record each collection 300 in the form of a list of identifiers of images, of a sub-collection. Each collection can possibly comprise one or more metadata of small memory size, for example a thumbnail representing all the collection, or the keywords, or a textual description etc.

A collection can also be a page distributed on the Internet, containing metadata necessary for the display of this document in a suitable markup language such as the HTML language, standing for Hypertext Markup Language in English, and containing links to objects in the form of identifiers 303 in replacement for conventional Web addresses.

Figure 4:
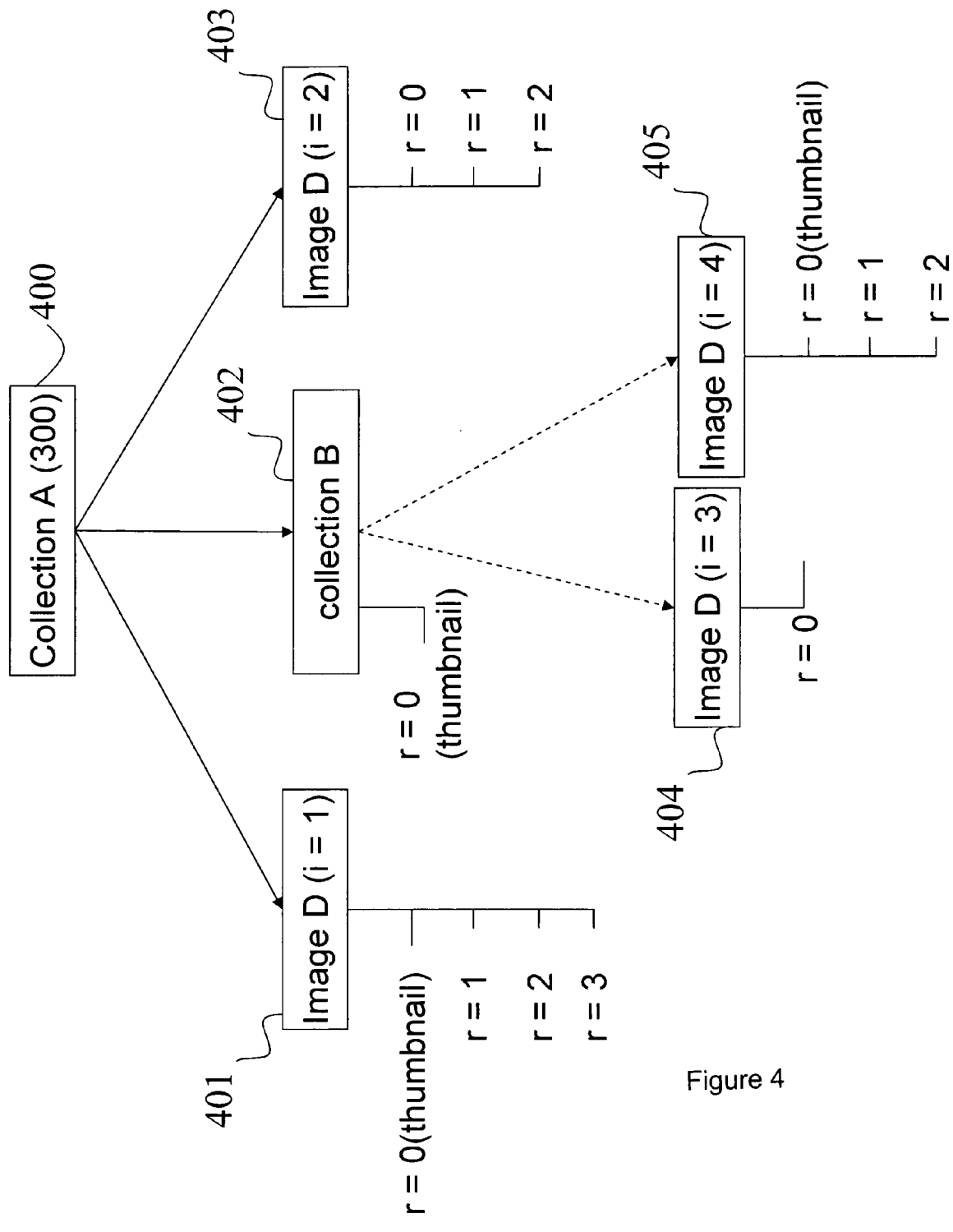
FIG. 4 depicts schematically an architecture of the data from a collection.

With reference to FIG. 4, this depicts the flow diagram illustrating the tree architecture of the sequencing of the accesses to the data constituting a collection.

A collection is the basic element from which a user can display images Di on the interface 140. When a collection is selected from the user interface 140, the display of the data Di is situated in the context 400 of a collection A. In this context, the method according to the invention offers the user the display of a first resolution level r=0 (here the thumbnails) of the elements constituting this first collection. Thus these thumbnails are displayed by all the images (image D (i=1) and image D (i=2)) identified by their identifier 303.

There also exist thumbnails (r=0) representing a collection: here for example for the (sub)collection B.

In other words, there may exist an associated thumbnail r=0 corresponding indifferently to an image in the collection, an assembly of several images in the collection, etc.

In one possible embodiment, the thumbnails corresponding to an image are included in each collection which references the images. In another embodiment, the thumbnails are available on a server accessible on the Internet (for example the central server in the case of a station to station network of the hybrid typology type) and/or can be replicated on the peer to peer network in the same way as the images.

When the user selects an image Di (image D(i=1) or image D(i=2)), from the context 400, the display context is shifted towards 401 or 403. From image contexts 401/403, the various image resolutions can be displayed, commencing with the resolution just higher (r=1) than that already displayed in the context 400 (that is to say resolution level r=0). When an image Di is selected, the first part (first loop) of the algorithm relating to a multiresolution document described with reference to FIG. 5 is executed.

If the user selects a sub-collection (for example collection B), the display context becomes a collection context. For example, the sub-collection context 402 corresponds to a collection context similar to 400 from which there is access to all the elements of the collection B (the images D (i=3) and D (i=4) are now accessible).

Figure 5:
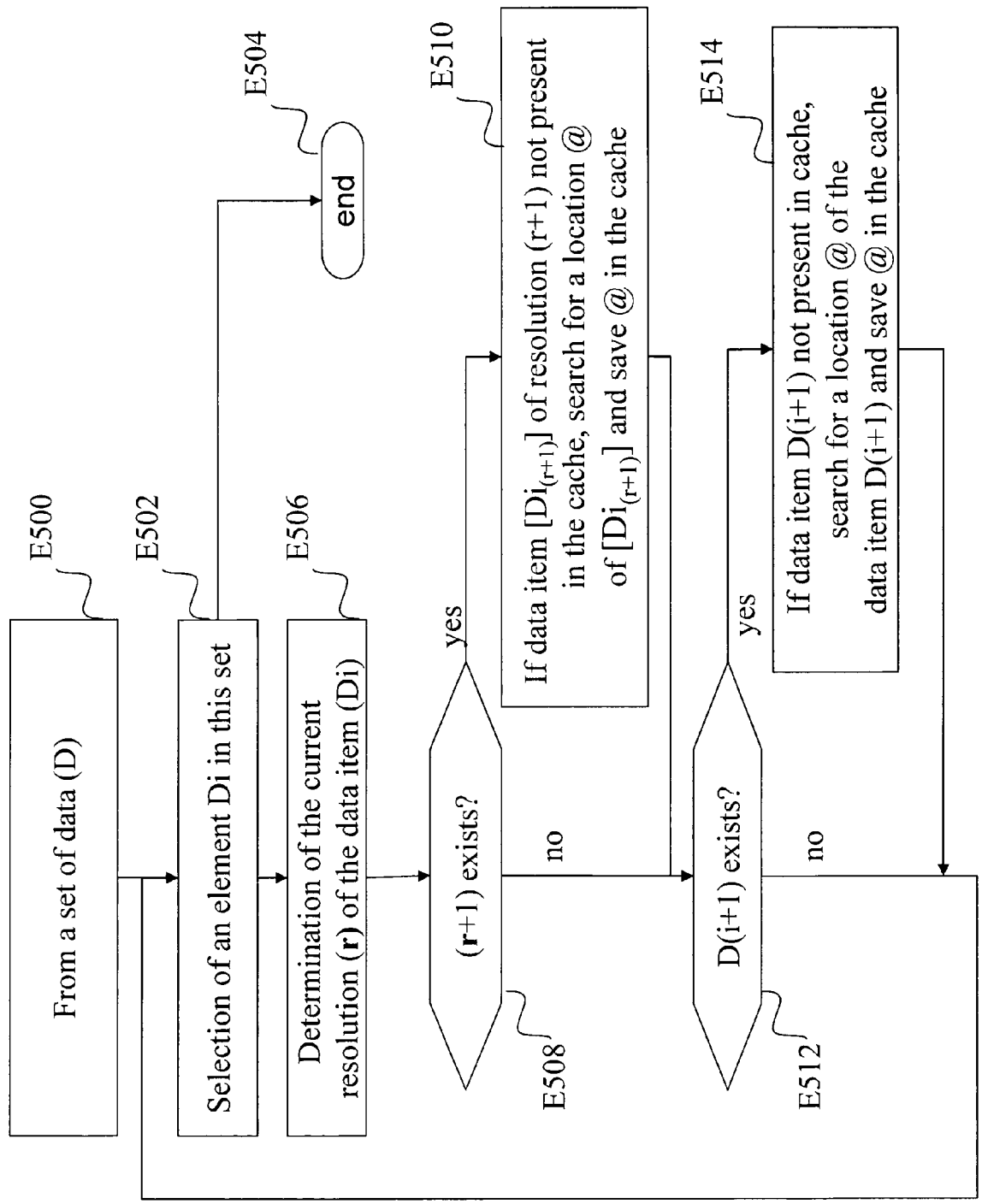
FIG. 5 is a flow diagram illustrating the steps of the access method according to the invention.

When a collection/sub-collection is selected, the second part of the algorithm (the second loop) described with reference to FIG. 5 is executed.

As the user displays and recovers, from other machines 100 in the network 120, a resolution level which is not known locally, this resolution is saved by the local server device 150 in the storage area 160 in order to be available locally in the event of a subsequent request.

Reference is now made to FIG. 5.

Step E500 corresponds to an entry point of the algorithm from a set of data Di in a digital document D.

According to step E502, the user selects a data item Di in this set D.

Each data item is designated by an identifier 302 or 303.

If the set D is empty (step E504), the algorithm ends.

In accordance with step E506, in the presence of a non-empty set D, the method determines the current resolution r of the data item Di.

In accordance with step E508, if the data item Di is multi-resolution (that is to say there exists a resolution greater (r+1) than the current resolution r), the method checks whether at least one address of a location containing the higher resolution r+1 of the data item Di with respect to the current resolution r is present in the local memory area (cache) 160. The address sought may be local or distant.

In accordance with step E510, in the absence of the address of the higher resolution r+1 in the storage means 160, the software 135 will seek in the network the said address of a location containing said higher resolution r+1.

In the event of a positive search, the storage means 160 store the address (or addresses) of the data item Di (r+1) thus found.

Step E510 closes the first loop of the algorithm in the case of a multiresolution digital document.

The first loop can be repeated for other data Di in the set D.

Likewise, the first loop can be repeated for other higher resolutions of the data item, for example the resolution r+2 or the resolution r+3 if such resolutions exist.

In an optional embodiment, the first loop can be executed by directly requesting the addresses of the resolution r+1 to m, where m is greater than r+1 (for example m is the maximum resolution). In this case, single search request is sent over the peer to peer communication network, whilst the responses received will contain more information: a peer may indicate in the same message all the resolution availabilities which it offers for an image.

The algorithm may then pass to the search for data of the same resolution as that selected during step E502, and having a different rank i (the second loop in the algorithm).

In accordance with step E512, the software checks whether the data item D (i+1) of rank i+1 exists.

In accordance with step E514, if no address of a location containing the data item D(i+1) is present in the cache 160, the software 135 will seek in the network the said address of one of these locations. If not, at least one address of a location containing the data item D(i+1) is present in the cache 160, the said address being a local or distant address.

In the case of a positive search, the storage means 160 store the address of the data item D(i+1) thus found.

The second loop of the algorithm can be repeated for other data Di in the set D.

Likewise, the second loop of the algorithm can be repeated for other ranks of the data item, for example the rank i+2 or the rank i+3 if such ranks exist.

For example, the number of ranks to be analyzed may be decided on according to the possibility of display of the display interface 140.

Figure 6:
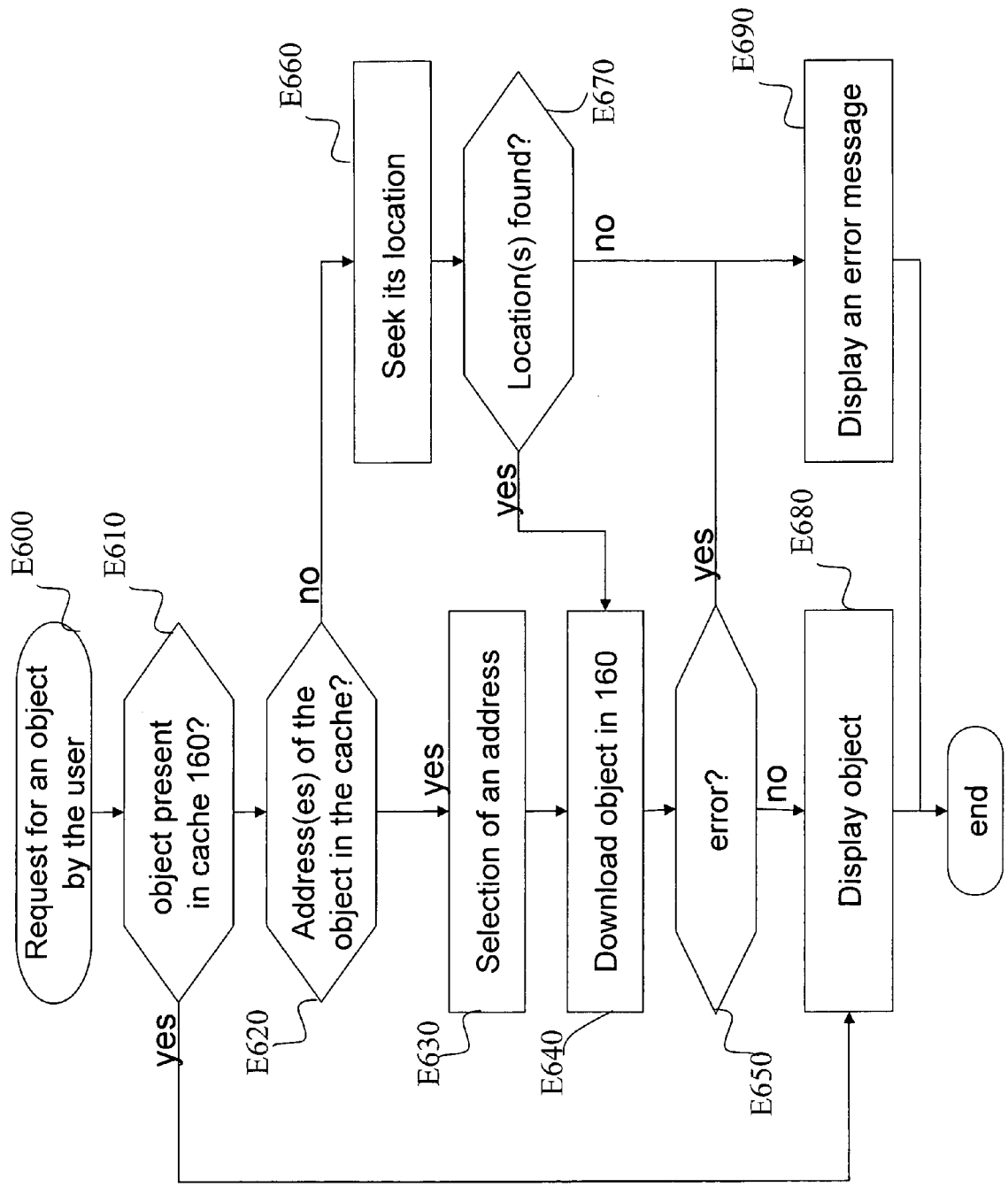
FIG. 6 is a flow diagram illustrating the behavior of a client machine at the time of a request for access to a data file (resource) according to the invention.

With reference to FIG. 6, the functioning of the software 135 executed by the local server device 150 of a client machine 100 during the recovery in cache memory of the locations of the data by anticipation has been described.

During step E600, the local server device 150 receives a request for accessing an element or object in a collection (it may be a case of a collection, a sub-collection or a resolution level of a multiresolution image).

If the object requested is present in the cache 160, the test E610 leads directly to step E680 in which said object is transmitted to the user interface 140, for display for example.

If the object requested is absent from the cache 160, a search is carried out at step E620 in order to check whether the cache 160 contains valid addresses (locations) for this object, recovered by anticipation according to the method described with reference to FIG. 5.

When addresses are present in the cache 160, the local server device 150 executes step E630 in order to choose one of the possible addresses in order to carry out the downloading of the document pointed to by the address thus stored by anticipation in the storage means 160 (step E640).

Storage of the addresses by anticipation thus makes it possible to obtain (download) said document from the location whose address is immediately available locally, that is to say at the storage means 160 of the client device, without waiting for the time necessary for recovery of this address in the network.

In the case of incomplete downloading or one resulting in a downloading failure (step E650), it is possible to return to step E620 in order to try another address in the cache.

If there is no address or no longer any address available in the cache 160, provision is made for seeking a location in a conventional manner and downloading this resource from the location thus found conventionally, that is to say without anticipation.

Anticipating the location according to the invention thus makes it possible to access a document more rapidly and without overloading the network traffic.

The invention claimed is:

1. A method of access to a digital document in a communication network of the peer-to-peer type, said method being implemented in a peer device and comprising the following steps:

monitoring one of said user's activity on at least one communication device, said monitoring based on a user software application and said at least one communication device, wherein said monitoring based on a user software application comprises monitoring a duration of time said user is active in said user software application and monitoring a duration of time said user was last active in said user software application;

selecting a first data item in a digital document, the digital document comprising at least first and second data items; and before any user request for said second data item:
  verifying the presence of at least one address of a location containing the second data item of the digital document in storage means of the peer device;
  in the absence of the address in the storage means of the peer device, seeking in the peer-to-peer network at least one address of a location containing the second data item among a local address on said peer device and a distant address on a distant peer device;
  in the event at least one address is obtained during the seeking step, storing in the storage means of the peer device the at least one address obtained during the seeking step;
  upon reception of a subsequent request to access the second data item, downloading the second data item of the document from one address thus store; and
  checking whether the downloading of the second data item is complete, and, if incomplete, downloading if more than one address has been obtained during the seeking step and stored in the storage means of the peer device, iteratively trying to access the second data item using another address obtained during the seeking step and stored in the storage means of the peer device, and determining if the access is complete.

2. A method according to claim 1, wherein the first and second data item are of the same resolution.

3. A method according to claim 1, wherein the digital document is a collection comprising a list of objects.

4. A method according to claim 1, wherein the first and second data items are of different resolutions.

5. A method according to claim 1, wherein the resolution of the first data item is less than that of the second data item.

6. A method according to claim 1, wherein the digital document comprises more than two different resolutions.

7. A method according to claim 1, further comprising the following steps:
  determining the first data item consisting in a current resolution of the digital document available at the peer device; and
  before any user request for said second data item:
    verifying the presence of at least one second address of a location containing the second data item consisting in a higher resolution of the digital document in the storage means of the peer device;
    in the absence of the address in the storage means, performing the step of seeking and the step of storing;
    in the case of a positive search, storing the address obtained through the seeking step in the storage means of the peer device; and
    upon receiving a subsequent request to access the higher resolution of the document, accessing the higher resolution of the document from the address thus stored.

8. A method according to claim 1, wherein the digital document belongs to the group consisting of fixed images or photographs, video sequences, and computer files of office application.

9. A peer device for access to a digital document in a communication network of the peer-to-peer type, said peer device comprising:
  means for selecting a first data item of a digital document, the digital document comprising at least first and second data items;
  processing means able to verify, before any user request for said second data item, the presence of at least one address of a location containing a second data item of the digital document in storage means of the peer device;
  search means able, in the absence of the address in the storage means, to seek in the peer-to-peer network at least one address of a location containing the second data item among a local address on said peer device and a distant address on a distant peer device;
  the storage means being able to store each address obtained by the search means;
  means for accessing, upon reception of a subsequent request to access the second data item, downloading the second data item of the document from one address thus stored; and
  means for checking whether the downloading of the second data item is complete, and, if incomplete, downloading if more than one address has been obtained during the seeking step and stored in the storage means of the peer device, and for iteratively trying to access the second data item using another address obtained during the seeking step and stored in the storage means of the peer device, and for determining if the access is complete.

10. A peer device according to claim 9, wherein the first and second data items are of the same resolution.

11. A peer device according to claim 9, wherein the digital document is a collection comprising a list of objects.

12. A peer device according to claim 9, wherein the first and second data items are of different resolutions.

13. A peer device according to claim 9, wherein the resolution of the first data item is less than that of the second data item.

14. A peer device according to claim 9, wherein the digital document comprises more than two different resolutions.

15. A peer device according to claim 9, wherein the processing means also determines the first data item consisting in a current resolution of the digital document available at the peer device and to verify the presence of at least one address of a location containing the second data item consisting in a higher resolution of the digital document in the storage means of the peer device.

16. A peer device according to claim 9, wherein the digital document belongs to the group consisting of fixed images or photographs, video sequences, and computer files of office application.

17. A computer program stored in a computer-readable medium, said program containing instructions for implementing a processing method according to claim 1, when this program is loaded in and executed by a computer system.

18. A method according to claim 1, wherein, when no other address is available for the step of iteratively trying to access the second data item using another address obtained during the seeking step and stored in the storage means of the peer device, performing another step of seeking at least one address of a location containing the second data item in the peer-to-peer network.

19. A method of access to a digital document in a communication network of the peer-to-peer type, said method being implemented in a peer device and comprising the following steps:

selecting a first data item in a digital document, the digital document comprising at least first and second data items; and before any user request for said second data item:

verifying the presence of at least one address of a location containing the second data item of the digital document in storage means of the peer device;

in the absence of the address in the storage means of the peer device, seeking in the peer-to-peer network at least one distant address of a distant peer device containing the second data item;

in the event at least one distant address is obtained during the seeking step, storing in the storage means of the peer device the at least one distant address obtained during the seeking step;

upon reception of a subsequent request to access the second data item, downloading the second data item of the document from address thus stored; and checking whether the downloading of the second data item is complete, and, if incomplete, downloading if more than one address has been obtained during the seeking step and stored in the storage means of the peer device, iteratively trying to access the second data item using another address obtained during the seeking step and stored in the storage means of the peer device, and determining if the access is complete.

\* \* \* \* \*